United States Patent [19]
Chiba et al.

[11] Patent Number: 4,903,525
[45] Date of Patent: Feb. 27, 1990

[54] ROTATIONAL POSITION SENSOR DEVICE FOR INTERNAL COMBUSTION ENGINE

[75] Inventors: Masaaki Chiba; Shigemi Murata, both of Himeji, Japan

[73] Assignee: Mitsubishi Denki Kabushiki Kaisha, Tokyo, Japan

[21] Appl. No.: 269,092

[22] Filed: Nov. 9, 1988

[30] Foreign Application Priority Data

Oct. 9, 1987 [JP] Japan ................................ 62-282552
Nov. 9, 1987 [JP] Japan ........................... 62-170981[U]

[51] Int. Cl.[4] ............................................ G01M 15/00
[52] U.S. Cl. ....................................................... 73/116
[58] Field of Search .................... 73/116, 117.3, 117.2, 73/865.1, 865.5; 324/208; 123/414, 476; 307/515

[56] References Cited

U.S. PATENT DOCUMENTS 4,718,396 1/1988 Shimada et al. ............... 73/117.3 X
4,787,355 11/1988 Maeda ................................ 123/414

FOREIGN PATENT DOCUMENTS 3047167 9/1981 Fed. Rep. of Germany ...... 324/208

*Primary Examiner*—Jerry W. Myracle
*Attorney, Agent, or Firm*—Sughrue, Mion, Zinn, Macpeak & Seas

[57] ABSTRACT

A rotational position sensor device for an internal combustion engine is disclosed, in which a sleeve member penetrating and rotatable in unison with a cam shaft is mounted on a rotational position sensor mounting member secured to an engine body, and a member with a slit for co-operation with a rotational position sensor is mounted on the sleeve. The performance of the device thus can be confirmed without actually assembling the device for use.

4 Claims, 3 Drawing Sheets

ROTATIONAL POSITION SENSOR DEVICE FOR INTERNAL COMBUSTION ENGINE

BACKGROUND OF THE INVENTION

1. Field of the Invention

This invention relates to a rotational position sensor device used for an internal combustion engine for detecting the rotational position thereof for ignition timing control or the like.

2. Description of the Prior Art

FIG. 4 is a sectional view showing a prior art internal combustion engine rotational position sensor device disclosed in Japanese Utility Model Publication Sho 60-23,714. In the figure, reference numeral 1 designates a timing cam pulley, 2 a cam shaft, on which the cam pulley 1 is mounted, 3 a bolt for securing the cam pulley 1 to the cam shaft 2, 4 a belt cover, 6 a rotational position sensor mounted on an engine body, and 7' and 8' annular ribs coaxially provided on an end face of the timing cam pulley 1. The ribs 7' and 8' have slits. When these slits pass by the rotational position sensor 6, the sensor 6 provides a signal corresponding to the rotational position of the cam shaft 2.

In the assembly of the above prior art internal combustion engine rotational position sensor device, the rotational position sensor 6 is first mounted on the engine body, and then the timing cam pulley 1 having the annular ribs 7' and 8' is mounted on the cam shaft 2. Therefore, the overall measurement accuracy of the device depends on the manufacturing accuracy of various components, and cannot be determined until the device has been actually assembled for use. In other words, the performance of the device can neither be confirmed nor ensured until it has been actually assembled for use. Further, when it is disassembled by removing the timing cam pulley 1 and other components and reassembled due to a defect of other components, its accuracy is subject to variations, and it is impossible to ensure a fixed performance.

SUMMARY OF THE INVENTION

This invention has been intended in order to overcome the above drawbacks, and its object is to provide an internal combustion engine rotational position sensor device, which is capable of performance checks without being actually assembled for use and can be shipped from the factory with an insurance of performance.

To attain the above object of the invention, there is provided a rotational position sensor device for an internal combustion engine comprising:

a sleeve detachably mounted on and rotatable in unison with a cam shaft;

a mounting member rotatably supported on said sleeve and secured to an engine body when mounted on a cam shaft;

a rotational position sensor mounted on said mounted member; and a member with a slit mounted on said sleeve and co-operating with said rotational position sensor.

The above and other objects, features and advantages of the invention will become more apparent from the following description when the same is considered with reference to the accompanying drawings.

DETAILED DESCRIPTION OF THE PREFERRED EMBODIMENTS

Figure 1:
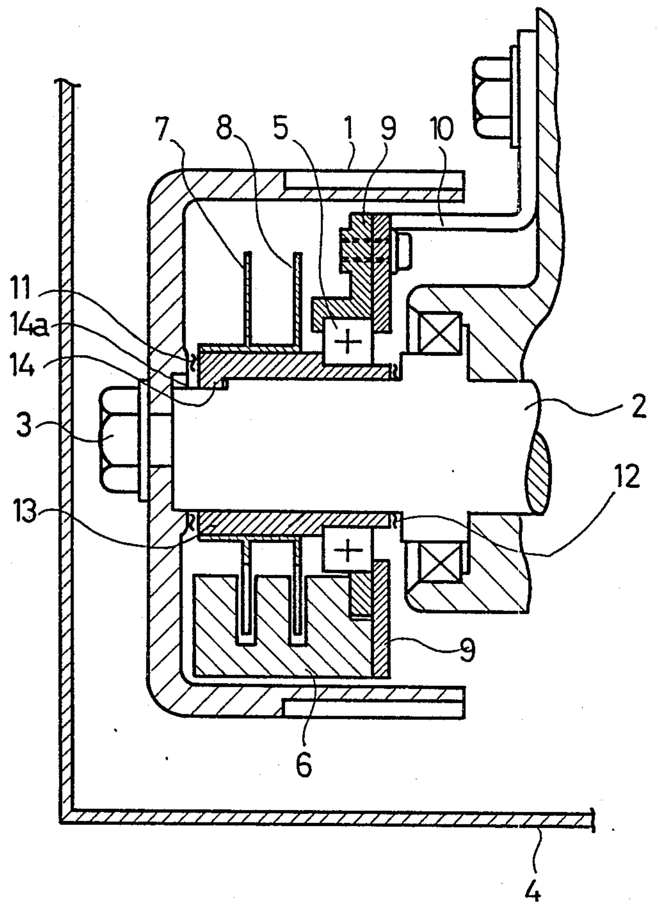
FIG. 1 is a sectional view showing an embodiment of the rotational position sensor device for an internal combustion engine according to the invention.

FIG. 1 is a sectional view showing an embodiment of the rotational position sensor device for an internal combustion engine according to the invention. Parts designated by reference numerals 1 to 4 are like those in the prior art device described before. Reference numeral 10 designates a support arm provided on the engine body side for supporting the embodiment of the internal combustion engine rotational position sensor device, 9 a body of the internal combustion engine rotational position sensor device supported by the support arm 10, 6 a rotational position sensor mounted on the body 9, 13 a sleeve rotatably mounted on the body 9, 5 a bearing, by which the sleeve 13 is rotatably supported on the body 9 (even when the sensor device is in stock), and 7 and 8 vane-like members secured to the sleeve 13. The vane-like members each have a slit formed adjacent to the periphery so that the rotational position sensor 6 provides a rotational position signal according to the rotation of the sleeve 13. The sleeve 13 is loosely fitted on the cam shaft 2, and it has a flat section 14 in engagement with a D-cut section 14*a* of the cam shaft 2 so that the sleeve 13 follows the rotation of the cam shaft 2. Reference numerals 11 and 12 designate wave washers.

Figure 2:
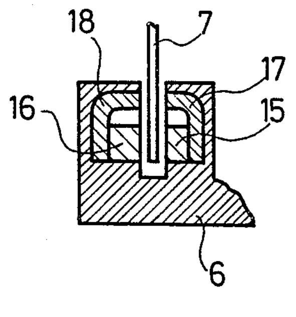
FIG. 2 is a fragmentary enlarged-scale sectional view showing the relation between rotational position sensor and vane-like member with a slit.

FIG. 2 shows the relation between the rotational position sensor 6 and vane-like member 7 as a specific example using a hole element. In the figure, reference numeral 15 designates a hole element, 16 a magnet, and 17 and 18 magnetic flux guides made of soft ion. Of course in this case, the vane-like member 7 is made of soft iron or like material, and when the slit of the vane-like member 7 comes to the rotational position sensor 6, the magnetic flux of the magnet 16 penetrates the hole element 15.

In the embodiment shown in FIG. 1, the body 9 of the device is secured to the engine body via the support arm 10. However, this form of securement is by no means limitative. For example, a support may be provided such that it extends from the engine body and parallel to the cam shaft 2, and the body 9 may be provided with a through hole which is penetrated by the support such that when the sleeve 13 is mounted on the cam shaft 12 the support penetrates the through hole of the body 9 to prevent rotation of the body 9.

Further, the above embodiment of the internal combustion engine rotational position sensor device is mounted on the cam shaft 2 on the inner side of the timing cam pulley 1, and, unlike the prior art internal combustion engine rotational position sensor device, in the above embodiment the rotation and stationary sections are coupled together via the bearing 5. Therefore, when mounting the device on the cam shaft 2, it is only necessary to fit the rotary section (i.e., the sleeve 13) of the device on the cam shaft 2 before the mounting of the timing cam pulley 1 and mount the stationary section (i.e., the body 9) on the engine body side via the support arm 10 and other parts. Thus, the device can be readily assembled. Of course, obviously the device can be performance-tested before it is assembled on the engine body.

Furthermore, since the sleeve 13 is mounted in such a manner as to prevent rotation of the body 9, vibrations of the cam shaft in the axial direction substantially have no adverse effect on the device. This is so because the sleeve 13 is coupled to the cam shaft 2 only in the rotational direction and is not coupled in the axial direction.

Figure 3:
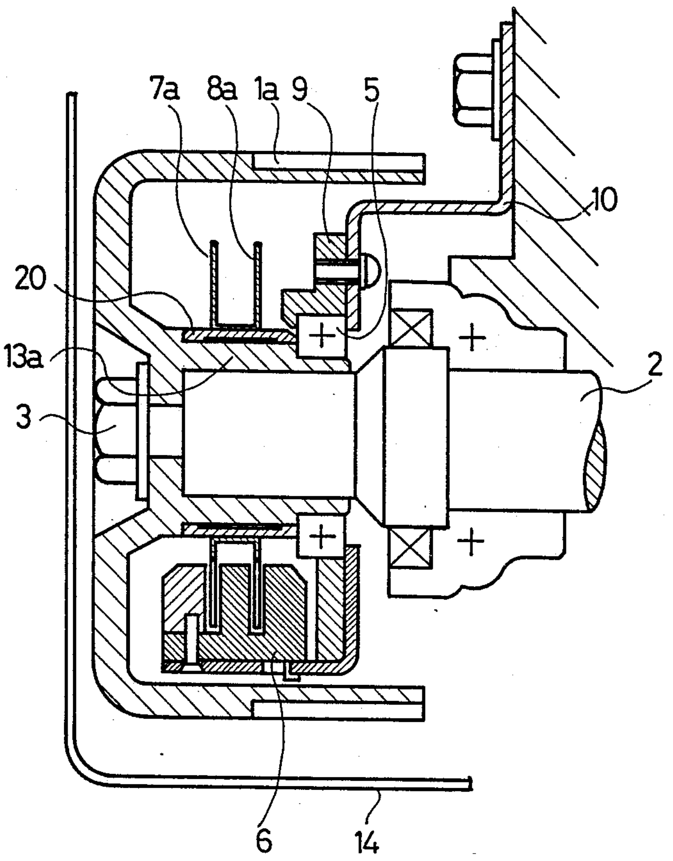
FIG. 3 is a sectional view showing a different embodiment of the rotational position sensor device for an internal combustion engine according to the invention.
Figure 4:
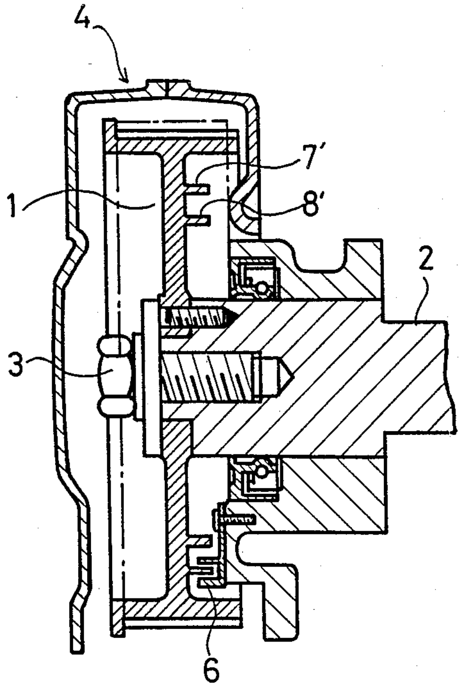
FIG. 4 is a sectional view showing a prior art rotational position sensor device for an internal combustion engine.

FIG. 3 shows a different embodiment of the invention. In this embodiment, vane-like members 7*a* and 8*a* are mounted on a sleeve 13*a* via a tube 20. The sleeve 13*a* is integral with a timing can pulley 1*a*.

In this embodiment, since the sleeve 13*a* is integral with the timing cam pulley 1*a*, the device is mounted on the cam shaft 2 in the operation of mounting the timing cam pulley 1*a* on the cam shaft 2.

As has been described in the foregoing, with the rotational position sensor device for an internal combustion engine according to the invention, which comprises a sleeve detachably mounted on and rotatable in unison with a cam shaft, a mounting member rotatably supported on said sleeve and secured to an engine body when mounted on a cam shaft, a rotational position sensor mounted on said mounting member, and a member with a slit mounted on said sleeve and co-operating with said rotational position sensor, the performance can be confirmed without actually mounting the device on the cam shaft for use, and thus the device can be shipped from the factory with a performance guarantee.

What is claimed is:

1. A rotational position sensor device for an internal combustion engine, comprising:

a sleeve (13; 13*a*) detachably mounted on and rotatable in unison with a cam shaft (2);

a mounting member (9) rotatably supported on said sleeve and fixedly secured to an engine body journalling said cam shaft;

a rotational position sensor (6) mounted on said mounting member; and a member (7,8; 7*a*, 8*a*) with a slit mounted on said sleeve and co-operating with said rotational position sensor.

2. The rotational position sensor device according to claim 1, wherein said mounting member is rotatably supported on said sleeve via a bearing (5).

3. The rotational position sensor device according to claim 1, wherein said mounting member is secured (10) to said engine body against rotation when it is mounted on said cam shaft.

4. The rotational position sensor device according to claim 1, wherein said sleeve is integral with a timing cam pulley (1).

* * * * *